US009413723B2

(12) United States Patent
Chen et al.

(10) Patent No.: US 9,413,723 B2
(45) Date of Patent: *Aug. 9, 2016

(54) CONFIGURING AND MANAGING REMOTE SECURITY DEVICES

(71) Applicant: Palo Alto Networks, Inc., Santa Clara, CA (US)

(72) Inventors: Yueh-Zen Chen, San Jose, CA (US); Wilson Xu, San Jose, CA (US); Monty Sher Gill, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/495,804

(22) Filed: Sep. 24, 2014

(65) Prior Publication Data

US 2015/0106909 A1    Apr. 16, 2015

Related U.S. Application Data

(63) Continuation of application No. 13/222,868, filed on Aug. 31, 2011, now Pat. No. 8,875,223.

(51) Int. Cl.
*H04L 29/06* (2006.01)
*G06F 21/62* (2013.01)

(52) U.S. Cl.
CPC ........ *H04L 63/0272* (2013.01); *G06F 21/6272* (2013.01); *H04L 63/029* (2013.01); *H04L 63/0254* (2013.01); *G06F 2221/2103* (2013.01); *G06F 2221/2141* (2013.01); *H04L 63/164* (2013.01); *H04L 63/20* (2013.01)

(58) Field of Classification Search
CPC ... H04L 63/0272; H04L 63/20; H04L 63/029; H04L 63/0254; H04L 63/164; G06F 21/6272; G06F 2221/2103; G06F 2221/2141
USPC ........... 726/1, 11–15; 709/224–225, 242, 244
See application file for complete search history.

(56) References Cited

U.S. PATENT DOCUMENTS

| 6,012,100 | A | * | 1/2000 | Frailong | ............... H04L 41/082 709/220 |
| 7,093,283 | B1 | * | 8/2006 | Chen | ....................... H04L 63/20 709/242 |
| 8,020,203 | B2 | * | 9/2011 | Kumar | ............... H04L 63/0272 709/221 |
| 8,406,170 | B2 | * | 3/2013 | Rune | ................. H04L 29/12066 370/328 |
| 2002/0178355 | A1 | | 11/2002 | D'Sa et al. | |
| 2004/0225895 | A1 | | 11/2004 | Mukherjee et al. | |
| 2007/0011733 | A1 | | 1/2007 | Gbadegesin et al. | |
| 2007/0266421 | A1 | * | 11/2007 | Vaidya | .................... H04L 63/20 726/1 |
| 2008/0318657 | A2 | | 12/2008 | Okada | |

(Continued)

*Primary Examiner* — Shanto M Abedin
(74) *Attorney, Agent, or Firm* — Van Pelt, Yi & James LLP

(57) ABSTRACT

Techniques for configuring and managing remote security devices are disclosed. In some embodiments, configuring and managing remote security devices includes receiving a registration request for a remote security device at a device for configuring and managing a plurality of remote security devices; verifying the registration request to determine that the remote security device is an authorized remote security device for an external network; and sending a response identifying one or more security gateways to the remote security device, in which the remote security device is automatically configured to connect to each of the one or more security gateways using a distinct Layer 3 protocol tunnel (e.g., a virtual private network (VPN)).

23 Claims, 6 Drawing Sheets

(56) References Cited

U.S. PATENT DOCUMENTS

| | | |
|---|---|---|
| 2009/0144817 A1 | 6/2009 | Kumar et al. |
| 2009/0228974 A1* | 9/2009 | Ivanov .................... H04L 41/28 726/15 |
| 2009/0328192 A1* | 12/2009 | Yang .................. H04L 63/0272 726/15 |
| 2010/0054222 A1 | 3/2010 | Rune et al. |
| 2010/0192196 A1 | 7/2010 | Lee |
| 2010/0248720 A1* | 9/2010 | Millet .................... H04W 12/06 455/435.1 |
| 2010/0306816 A1* | 12/2010 | McGrew ............. H04L 63/1408 726/1 |
| 2012/0005476 A1* | 1/2012 | Wei ..................... H04L 63/0272 713/153 |
| 2012/0005746 A1 | 1/2012 | Wei et al. |
| 2012/0204253 A1 | 8/2012 | Sugimoto et al. |
| 2012/0272293 A1* | 10/2012 | Jankowski ................ G06F 9/54 726/4 |

\* cited by examiner

CONFIGURING AND MANAGING REMOTE SECURITY DEVICES

CROSS REFERENCE TO OTHER APPLICATIONS

This application is a continuation of co-pending U.S. patent application Ser. No. 13/222,868, entitled CONFIGURING AND MANAGING REMOTE SECURITY DEVICES filed Aug. 31, 2011 which is incorporated herein by reference for all purposes.

BACKGROUND OF THE INVENTION

Security devices are used to protect a computer network from unauthorized, malicious, or disruptive users. Examples of security devices include firewalls, Intrusion Detection Systems (IDSs), Intrusion Prevention Systems (IPSs), Unified Threat Management (UTM) systems, and the like.

Some security devices are flow based (e.g., also known as stateful security devices). Flow based security devices typically store information regarding flows associated with received packets. Flow based security devices can perform security processing (e.g., determining whether to drop a packet or allow the packet to pass) using the stored information regarding flows. Typically, a flow based security device stores information regarding flows in a flow table (e.g., also known as a session table or a state table).

BRIEF DESCRIPTION OF THE DRAWINGS

Various embodiments of the invention are disclosed in the following detailed description and the accompanying drawings.

DETAILED DESCRIPTION

Figure 1:
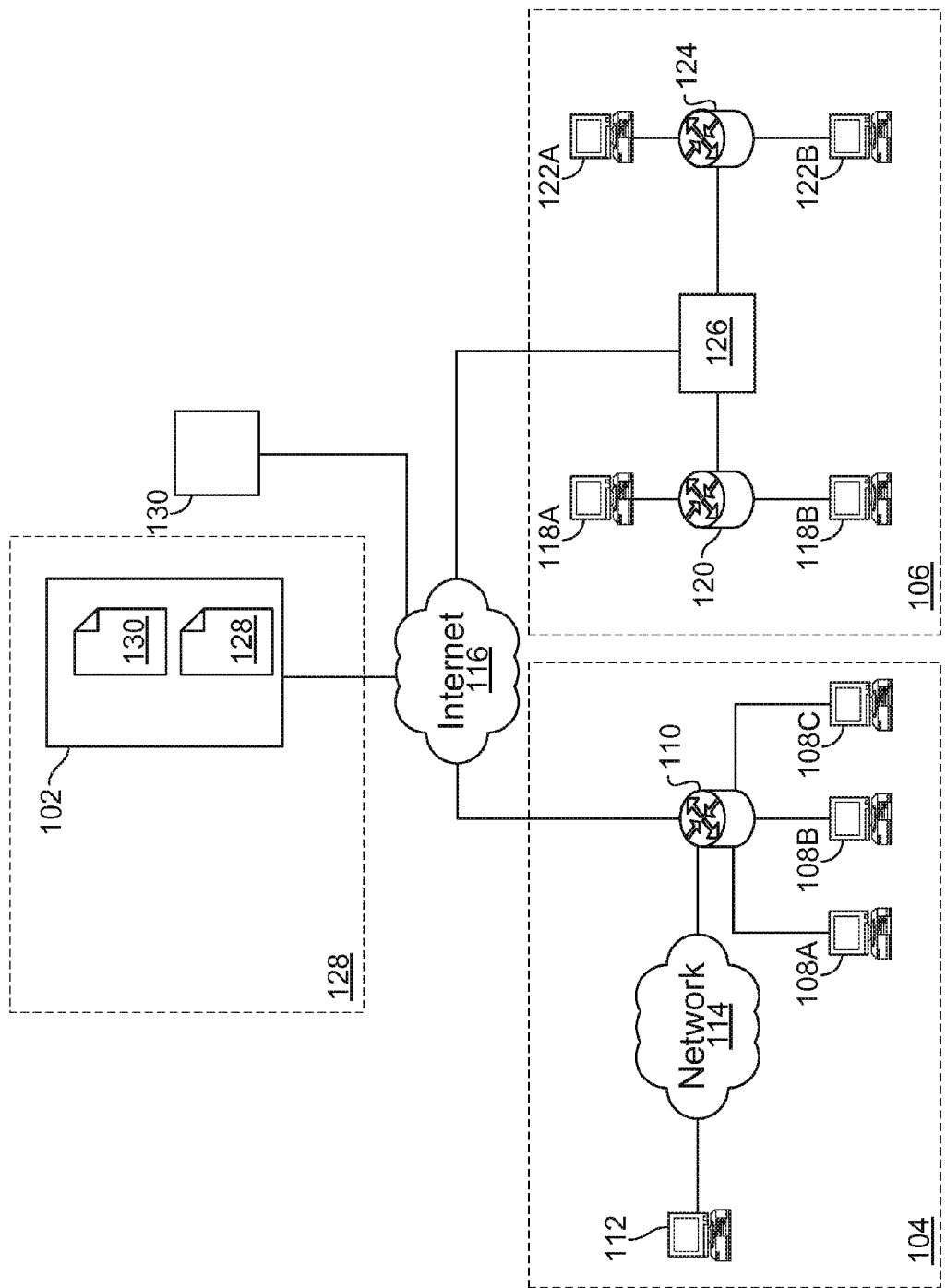
FIG. 1 is a block diagram illustrating an example network topology for a remote security device in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Security devices are generally used to protect a computer network from unauthorized, malicious, or disruptive users. Examples of security devices include firewalls, Intrusion Detection Systems (IDSs), Intrusion Prevention Systems (IPSs), Unified Threat Management (UTM) systems, and the like. Security devices can also include integrated security devices, such as security appliances that include various security functionality, such as firewall, antimalware, antispam, IDS, IPS, and/or VPN functionality.

Some security devices are flow based (e.g., also known as stateful security devices, such a stateful security appliance that includes a stateful firewall). Flow based security devices typically store information regarding flows associated with received packets. Flow based security devices can perform security processing (e.g., determining whether to drop a packet or allow the packet to pass) using the stored information regarding flows. Typically, a flow based security device stores information regarding flows in a flow table (e.g., also known as a session table or a state table).

Security devices are generally located to protect a particular network (e.g., located at a perimeter of a network, such as an edge network). Security devices can include security gateways, security appliances, security based routers, and/or other specialized or dedicated security devices that include, for example, routing functionality as well as security functionality.

An enterprise network, such as for a corporation, governmental organization, educational institution, residential area, and/or any other entity, can include one or more networks that need to be protected. As such, an entity is, for example, a corporation, a university, a residential area, or the like. Other types of entities are possible. Various users associated with an entity communicate with each other using the entity's network. For example, a corporate enterprise network can include a network for the corporate headquarters, and one or more edge networks for branch or satellite offices (e.g., which are typically located in different geographical areas). In this example, a security device can be located on the corporate enterprise network (e.g., at a perimeter of the corporate enterprise network), and remote security devices can be located at each of the branch or satellite offices.

However, deploying remote security devices at each of the branch or satellite offices typically requires a security or network administrator to be onsite at each branch or satellite office in order to properly setup and configure the remote security device for each edge network. What is needed is a more scalable and efficient approach for deploying remote security devices.

Accordingly, techniques for configuring and managing remote security devices are disclosed. In some embodiments, configuring and managing remote security devices includes receiving a registration request for a remote security device at a device for configuring and managing a plurality of remote security devices; verifying the registration request to determine that the remote security device is an authorized remote security device for an external network; and sending a response identifying one or more security gateways to the remote security device, in which the remote security device is automatically configured to connect to each of the one or more security gateways using a distinct Layer 3 protocol tunnel (e.g., a virtual private network (VPN)).

In some embodiments, configuring and managing remote security devices includes sending a registration request from a remote security device to a device for configuring and managing a plurality of remote security devices each associated with one or more external networks, in which the registration request includes credentials for verifying the remote security device; receiving a response identifying one or more security gateways; and automatically attempting to connect to each of the one or more security gateways over the remote security device's associated tunnel using a distinct Layer 3 protocol tunnel.

In some embodiments, a remote security device for an external network performs security processing for at least a portion of outbound network traffic for the external network. In some embodiments, the remote security device for the external network establishes a Layer 3 protocol tunnel to an available security gateway, and routes at least a portion of outbound network traffic for the external network to the security gateway, in which the security gateway performs security processing for the routed traffic. In some embodiments, the security gateway performs security processing for at least a portion (e.g., and possibly all) of the network traffic for one or more external networks (e.g., where the external networks are operated by distinct entities, such as for branch or satellite offices, in which the security gateway can be at a larger or main office). For example, this approach can be useful for entities that have one or more small and/or medium sized external networks (e.g., branch/satellite offices) that do not want to purchase and maintain more robust and possibly more expensive security devices for the sole use of protecting those smaller external networks. Also, various techniques described herein facilitate efficient and scalable approaches for deploying remote security devices. In addition, various techniques described herein facilitate efficient and scalable approaches for managing remote security devices. Moreover, various techniques described herein facilitate efficient and scalable approaches for providing failover techniques for remote security devices.

FIG. 1 is a block diagram illustrating an example network topology for a remote security device in accordance with some embodiments. As shown, a security gateway 102 protects a network 128 and is in communication with the Internet 116, which is in communication with external networks 104 and 106. External network 104 includes a remote security device 110. External network 106 includes a remote security device 126. External network 104 also includes various computing devices 108A-C and 112 in communication via network 114 (e.g., a local area network or wireless network). External network 104 also includes various computing devices 118A-B and 122A-B in communication via routers 120 and 124, respectively, to a remote security device 126.

In some embodiments, a remote security device (e.g., remote security device 110 and/or 126) includes functionality (e.g., a shim or router) for routing traffic from an external network to a security gateway over a Layer 3 protocol tunnel (e.g., a VPN tunnel) using various techniques described herein. In some embodiments, a remote security device also includes security functionality for performing security processing for at least a portion of network traffic on an external network.

In some embodiments, a security gateway (e.g., security gateway 102) provides security processing for network traffic from one or more external networks (e.g., external networks 104 and 106). In some embodiments, the remote security device 102 receives network traffic from the external networks over another network (e.g., the Internet 116) over a secured tunnel, such as a Layer 3 protocol tunnel (e.g., a VPN tunnel). For example, the security gateway can include one or more computer systems and/or specialized or dedicated hardware for network and security processing (e.g., an integrated security appliance or a security server).

In some embodiments, an external network includes a computer network (e.g., a local area network (LAN) or a wide area network (WAN)), which is distinct (e.g., a different geographical location from the network protected by the security gateway and/or different or independent private IP addressing).

The external network 104 includes three client devices 108 that communicate using the remote security device 110 (e.g., which includes router functionality). The external network 104 also includes another client device 112 that communicates with the remote security device 110 (e.g., which includes router functionality as described herein) over a network 114. The other client device 112 is, for example, physically remote from the other devices. For example, the other client device 112 can be a home computer communicating with an office's LAN using a virtual private network (VPN).

In some embodiments, the remote security device 110 routes at least a portion of the network traffic on the external network 104 to the security gateway 102 for security processing. The remote security device 110 creates a secure tunnel (e.g., a Layer 3 protocol tunnel, such as a VPN tunnel) between the external network 104 and the remote security device 102 by encapsulating packets that are, for example, destined for other destinations in network traffic destined for the security gateway 102. For example, the remote security device 110 can route all outbound network traffic to the security gateway 102 for security processing. As another example, the remote security device 110 can selectively route a portion of the outbound network traffic to the security gateway 102 for security processing. The portion of the outbound network traffic that is routed over the security tunnel to the security gateway for security processing can be based on various security policies, such as for traffic that is directed to network resources on the network 128 protected by the security gateway 102 (e.g., corporate headquarter file servers, databases, internal web sites, and/or other computing or network resources available on the corporate headquarters network protected by the security gateway) and/or based on various other criteria, such as user, network traffic type, source, destination, protocol, application, day/time of request, data type, data size of request (e.g., large e-mails or downloads), capacity and/or load on the security gateway and/or the remote security device, and/or any other resource or criteria or combination thereof. In some embodiments, the secure tunnel is Layer 3 protocol tunnel (e.g., a virtual private network (VPN) tunnel), and the encapsulated packets are Layer 3 protocol packets or Layer 4 protocol packets (e.g., Transmission Control Protocol (TCP)/Internet Protocol (IP) packets). Other types of tunneling protocols are possible. Examples of other tunneling protocols include Generic Routing Encapsulation (GRE) and Secure Shell (SSH) tunneling. The tunnel terminates at an edge of the external network 104. An edge includes any device that sends or receives traffic from outside of the external network 104.

In some embodiments, a remote security device is automatically configured to establish a secure tunnel connection to each of the one or more security gateways of, for example, an entity's secured network. In some embodiments, the remote security device is automatically configured with a set of secure gateways to which to connect to using a secure tunnel.

In some embodiments, a remote security device (e.g., remote security device 110 and/or 126) establishes secure tunnels to all known security gateways (e.g., based on configuration settings for the remote security device, which includes a list of security gateways and credentials for establishing secure tunnels with each of the security gateways), and the remote security device 110 selectively routes traffic to different security gateways from the remote security device. For example, a first security gateway for a California office for a given entity can protect the 10.1.0.0/24 network for this office, and a second security gateway for a Virginia office for this entity can protect the 10.2.0.0/24 network for this office. In this example, a remote security device for a Chicago office for this entity establishes secure tunnels to the first and second security gateways, and the remote security device for the Chicago office for this entity can route traffic directed to any resource in 10.1.0.0/24 (e.g., network resources available at the California office for this entity), such that the network traffic is routed using the tunnel connected to the first security gateway, and the first security gateway can then perform security processing on this routed network traffic attempting to communicate with a network resource at the California office for this entity. Similarly, the remote security device for the Chicago office for this entity can also route traffic directed to any resource in 10.2.0.0/24 (e.g., network resources available at the Virginia office for this entity), such that the network traffic is routed using the tunnel connected to the second security gateway, and the second security gateway can then perform security processing on this routed network traffic attempting to communicate with a network resource at the Virginia office for this entity. In some embodiments, the first or second remote security gateway can route traffic directed to any resource in 10.3.0.0/24 (e.g., network resources available at the Chicago office for this entity), such that the network traffic is routed using the tunnel connected to the remote security device for the Chicago office, and the remote security device for the Chicago office can then perform security processing on this routed network traffic attempting to communicate with a network resource at the Chicago office for this entity.

In some embodiments, the remote security device is automatically configured with a set of secure gateways to which to connect to using a secure tunnel, and the remote security device can also be configured to route traffic to one or more of the security gateways based on a prioritization scheme associated with such security gateways. For example, if the first (e.g., highest priority or preferred) security gateway is not available, declines the request, drops the request and is no longer available, and/or for other possible reasons, the remote security device can attempt to route the traffic to the second (e.g., next highest priority or next preferred) security gateway. The prioritizations can be based on network/data types, geographical location, security policy, and/or other network topology, network bandwidth, and/or security or other reasons. In some embodiments, the remote security device is automatically configured to select one of the security gateways to route outbound traffic to based on a level of traffic on the external network, a network capacity/availability of the security gateway, and/or based on other network resource, availability or Quality of Service (QoS) reasons. For example, if a first security gateway becomes busy or response time decreases, the remote security device can attempt to route traffic to a second security gateway, in which the remote security device is connected via a secure tunnel with the first security gateway and the second security gateway.

Referring to FIG. 1, the external network 106 includes two client devices 118A-B communicating using a router 120 and two other client devices 122A-B communicating using another router 124. Neither router 120 and 124 is an edge of the second external network 106, because the routers 120 and 124 do not communicate directly with computers outside the network 106. Instead, both routers 120 and 124 route traffic to a remote security device 126 that is an edge of the network 106.

In some embodiments, the remote security device 126 establishes a tunnel between the network 106 and the security gateway 102 by encapsulating packets destined for other destinations (e.g., outbound network traffic, that is, traffic directed to destinations outside of network 106) in traffic destined for the remote security device 102. In some embodiments, the remote security device 126 is a dedicated networking device that performs as its primary functions routing outbound or selected network traffic over a secure tunnel to the security gateway 102 for security processing. In some embodiments, the remote security device 126 is also capable of performing security processing (e.g., based on a local security policy, a central security policy, and/or any other security policy or combination thereof based on the processed traffic). In some embodiments, the remote security device 126 includes similar or equivalent functionality, hardware processing capabilities, and/or both as the security gateway 102. As also shown in FIG. 1, a console device 130 is provided for configuring and managing a plurality of remote security devices and is in communication with the Internet 116. In some embodiments, the console device communicates configuration, updates, notifications (e.g., messages and/or alerts) to the security gateway 102 and the remote security devices 110 and 126. In some embodiments, the console device 130 receives a registration request for each new remote security device; verifies the registration request to determine that the remote security device is an authorized remote security device for an external network; and identifies one or more security gateways (e.g., sends a list, or a prioritized list, of security gateways) to the authorized remote security device, in which the remote security device is automatically configured to connect to each of the one or more security gateways over the remote security device's associated tunnel using a distinct Layer 3 protocol tunnel. In some embodiments, the security device is authenticated in order to establish a tunnel with each of the security gateways. For example, this authentication can be performed through certificates (e.g., by using Online Certificate Status Protocol (OCSP) techniques to verify both the security gateway and the remote security device). In some embodiments, the console device 130 executes a portal (e.g., that can support an Online Certificate Status Protocol (OCSP)) that can be used for configuring and managing the plurality of remote security devices.

In some embodiments, the console device 130 identifies an updated set of one or more security gateways (e.g., sends a new or updated list or a new, or updated prioritized list, of security gateways) to the authorized remote security device, in which the remote security device is automatically configured to connect to a second security gateway over the remote security device's associated tunnel using a distinct Layer 3 protocol tunnel, and in which the second security gateway is included in the identified updated set of one or more security gateways. For example, this technique can be used by a central administrator to automatically change the network topology of the enterprise network by changing the associations between various security gateways and various remote security devices, and/or by distribution of new security policies or configurations to facilitate managing a dynamic and secure network topology. In some embodiments, the console device 130 revokes a certificate issued to the remote security device, in which the remote security device can no longer connect to the first security gateway after revocation of its certificate. For example, this technique can be used by a central administrator to automatically change the network topology if the external network associated with the remote security device has been compromised or is no longer allowed access to other portions of the enterprise network. In some embodiments, the console device 130 sends a new certificate authorizing the remote security device, in which the remote security device automatically establishes a new tunnel with the security gateway(s) using the new certificate. In some embodiments, the console device 130 revokes the certificate issued to the security gateway(s), which prevents the remote security device from establishing a tunnel to such security gateway(s).

In some embodiments, the entities associated with the external networks 104 and 106 establish security policies 128 and 130 for their networks with the remote security device 102 and/or in combination with the respective remote security devices 110 and 126, as described herein with respect to various embodiments. For example, a network administrator for an entity can provide a security policy to the remote security device 102. In some embodiments, a network administrator can connect to the remote security device 102 using a web browser on a client device (e.g., one of the client devices 108A-C in the first external network 104) and establish and modify a security policy for a network using the console device 130.

In some embodiments, a security policy specifies preferences for performing security processing on network traffic. For example, a security policy can include simple preferences, such as network addresses to be blocked or allowed, and complex preferences, such as what users should have access to what network resources. In some embodiments, a security policy specifies what users should be allowed access to certain web applications (e.g., web email, social networking, and the like). For example, a security policy can grant access to social networking web applications to corporate marketing executives and deny access to those web applications to other employees.

In some embodiments, the security gateway 102 receives packets (e.g., for all or selected outbound network traffic, such as described herein) from the external networks 104 and 106 and, for each packet, selects a security policy (e.g., based on the packet's originating network and/or other criteria or parameters, as described herein with respect to various embodiments). In some embodiments, the security gateway 102 performs security processing using the packet and the selected security policy. Security processing includes, for example, blocking packets associated with an attempted network security intrusion, detecting and removing viruses, Data Leakage Prevention (DLP), and/or various other types of security processing. After security processing on a packet, the remote security device 102 forwards the packet, drops the packet, and/or performs some other action (e.g., throttles the flow associated with the packet, alerts based on the flow associated with the packet, or continues to monitor the flow associated with the packet for further security processing). In some embodiments, each remote security device performs security processing based on a selected security policy for network traffic that is not selected for routing to the security gateway.

The two external networks 104 and 106 in communication with the security gateway 102 shown in FIG. 1 are just examples of external networks. Various other configurations and various other network topologies of client devices, routers, switches, remote security devices, security gateways, and other networking devices are possible and can use the various techniques described herein. For example, external networks can include multiple devices that are edges of the network and that route traffic to the security gateway 102 and/or to one or more other remote security gateways. For example, the remote security devices can be security appliances or other security devices that support VPN functionality, routers that support VPN functionality (e.g., as in the external network 104), shim devices or other types of network devices with various security functionality (e.g., as in the second external network 106), network address translation (NAT) devices, and/or various other types of devices or combinations thereof that can perform the various remote security device techniques described herein.

Figure 2:
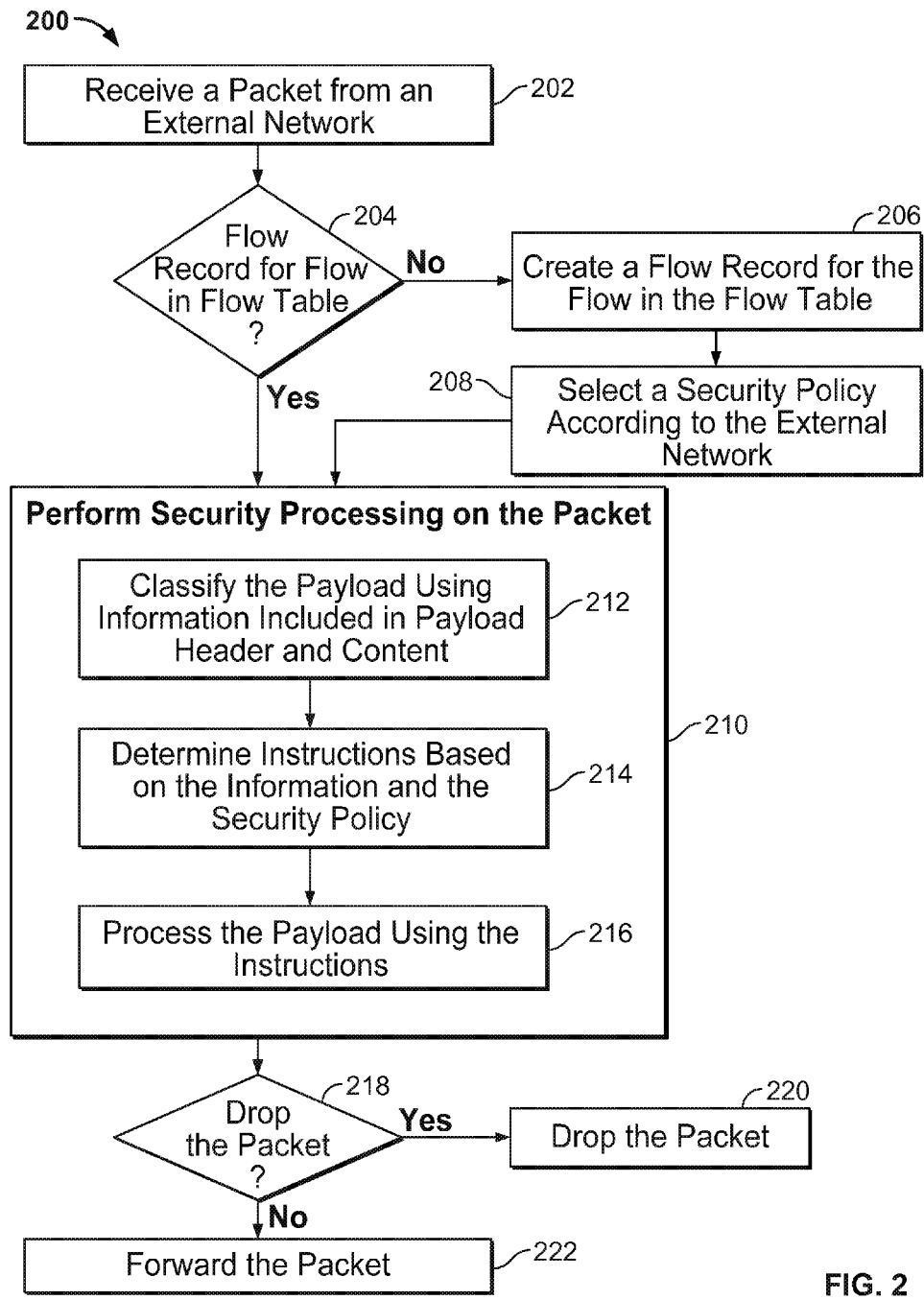
FIG. 2 is a flow diagram of an example technique for performing remote security processing in accordance with some embodiments.

FIG. 2 is a flow diagram of an example technique 200 for performing remote security processing in accordance with some embodiments. For purposes of illustration, the process 200 will be described with respect to a system (e.g., security gateway 102 in secure tunnel communication with a remote security device 110 or 126) that performs the process. At 202, the system receives a packet from an external network. For example, the packet can be a TCP/IP packet or a packet conforming to another type of protocol. The packet generally includes header information and content. The packet is encapsulated so that the system receives the packet from a tunnel that terminates at an edge of the external network.

At 204, the system determines whether there is a flow record for a flow associated with the packet in a flow table. A flow generally refers to a sequence of one or more packets communicating information between a source and a destination. A flow typically includes packets going in one direction (e.g., source to destination or the reverse), but in some cases can include packets going in both directions. For example, a flow can be a TCP connection or one side of a TCP connection (e.g., going only from a source to a destination). In another example, a flow is a sequence of User Datagram Protocol (UDP) packets. Although UDP is connectionless, a flow based security engine can identify a UDP flow based on, for example, header information of the UDP packets. Other types of flows are possible.

A flow table generally includes flow records for flows associated with packets. A flow record includes, for example, a five tuple of header information and other flow information. Flow information includes, for example, security policy information (e.g., policy to apply to the flow, such as firewall policy, IPS policy, and so on), encryption parameters, address translation parameters, bookkeeping information, statistics, network policy information (e.g., relating to connection time outs, time billing, and/or bandwidth usage), a reference to one or more applications associated with the flow, and so on. Flow tables are discussed further below in reference to FIG. 3, which provides an example flow table.

At 206, if a flow record does not exist in the flow table, the system creates a flow record for the flow in the flow table. At 208, the system selects a security policy according to the external network. The system associates the security policy with the flow (e.g., by including a reference to the security policy in the flow record for the flow).

At 210, the system performs security processing on the packet. In some embodiments, the system examines the payload to classify the payload. At 212, the system classifies the payload using information included in a payload header and payload content.

In some embodiments, the system classifies the packet for further processing based on signatures detected, for example at the application level. The system uses the content of the packet. Typically, the system performs signature matching by comparing the content of the packet with signatures in a signature database. Signature matching can include, for example, fixed pattern matching, regular expression matching, and/or specialized matching performed by, for example, specialized software to detect complex application behavior patterns or a combination of the above. In some embodiments, the system performs TCP reassembly using multiple packets before performing signature matching or other analysis to determine an application associated with received packets.

At 214, the system determines instructions for processing the payload based on the information and the security policy associated with the packet's flow. At 216, the system processes the payload using the instruction. Processing the packet includes, for example, logging, storing, allowing the packet to pass, setting an alarm, blocking the packet, and/or dropping the packet. In some embodiments, processing the packet includes performing virus detection and removal, digital leakage protection (DLP), and/or other security functions.

At 218, the system determines whether to drop the packet. For example, the system can compare the address of the packet with a list of addresses to block, or determine whether the packet is affected by a virus based on the security processing performed in step 216. If the system determines to drop the packet, the system drops the packet at 220. In some implementations, the system logs or reports the dropped packet. If the system determines not to drop the packet, the system forwards the packet at 222 (e.g., to its original destination).

Figure 3:
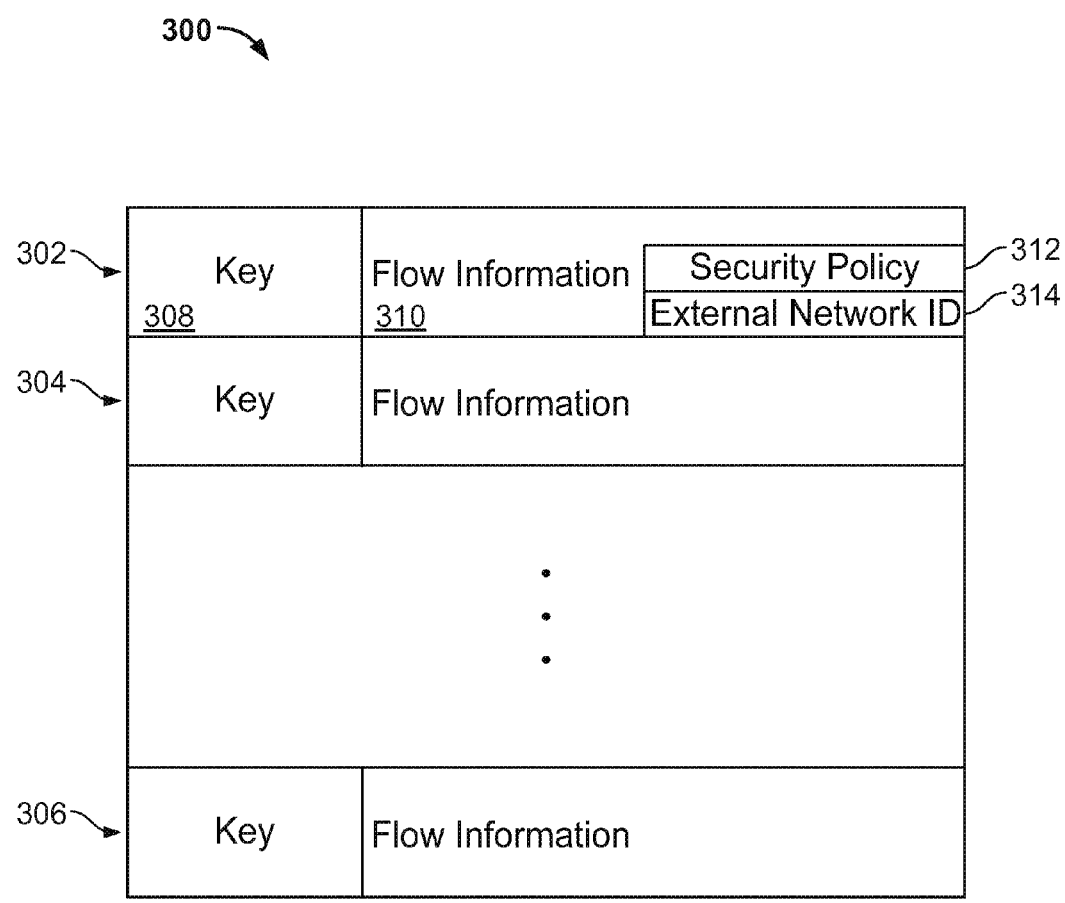
FIG. 3 illustrates a structure of an example flow table in accordance with some embodiments.

FIG. 3 illustrates a structure of an example flow table 300 in accordance with some embodiments. As shown, rows 302, 304, and 306 of the flow table 300 represent flow records associated with flows. Referring to flow record 302, the flow record 302 includes an indexing key 308. A security device (e.g., security gateway 102 and/or remote security device 110 or 126) can use the indexing key 308 to store and retrieve the flow record 308 when it receives a packet associated with the flow. In some embodiments, the indexing key 308 is a hash key (e.g., based on state information) and the flow table 300 is implemented as a hash table. The flow record 302 also includes flow information 310, such as flow information as described above in connection with stage 206 of process 200 and as shown in FIG. 2. The flow information 310 includes a reference to a security policy 312 that, for example, can also be based on the external network from which the flow is originating, and/or based on source, protocol, application, and/or various other information as described herein. In some embodiments, the flow information 310 also includes an external network identifier 314 to identify from which the flow is originating that distinguishes the various external networks. The identifier is, for example, an IP address or a list of IP addresses.

Figure 4:
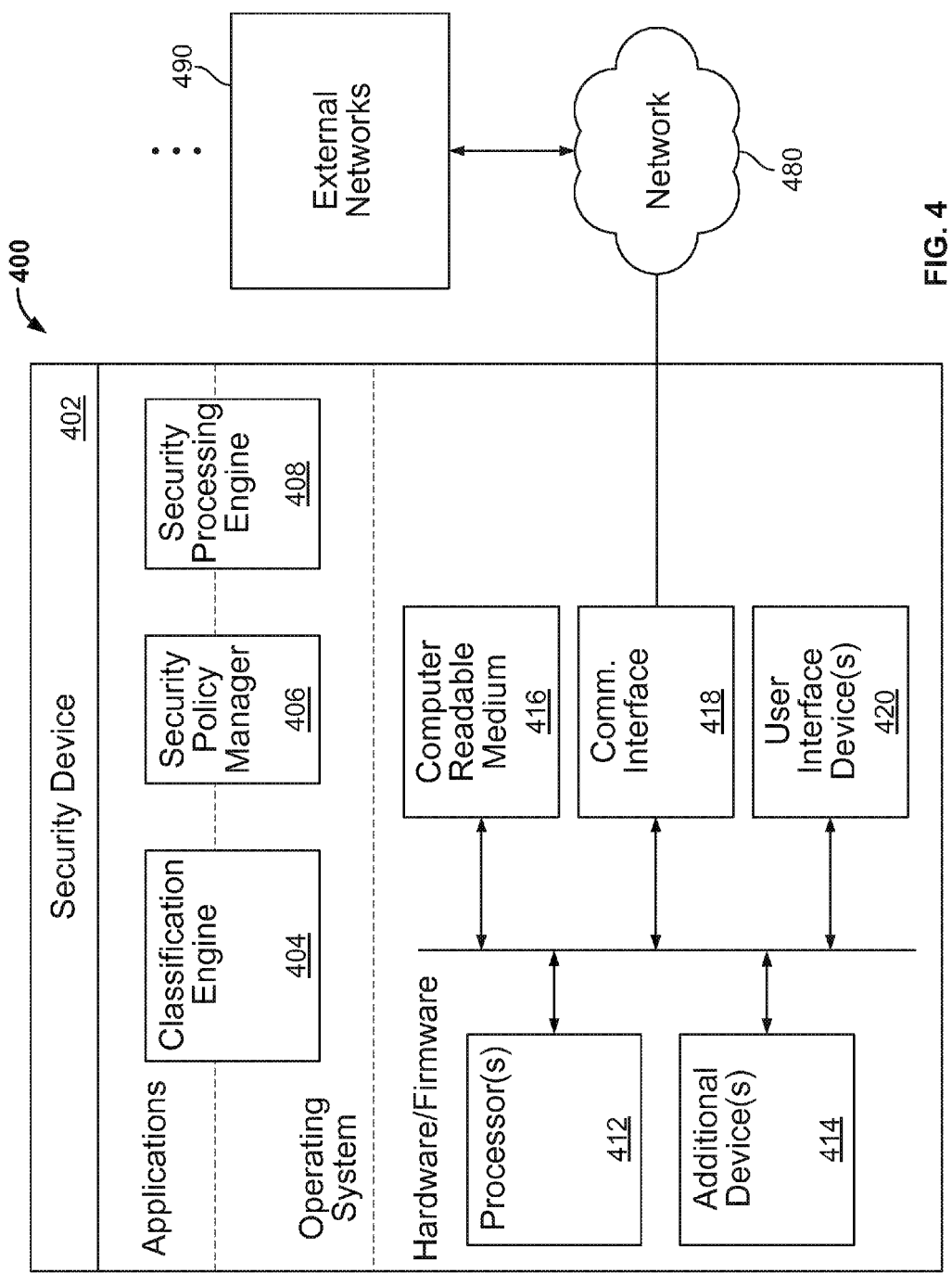
FIG. 4 is a schematic diagram of an example system configured to perform security processing in accordance with some embodiments.

FIG. 4 is a schematic diagram of an example system configured to perform security processing in accordance with some embodiments. As shown the system 400 includes a security device 402 (e.g., security gateway 102). The security device 402 is optionally connected to one or more external networks 490 through a network 480. The security device 402 includes one or more data processing apparatus. While only one data processing apparatus is shown in FIG. 4, multiple data processing apparatus can be used. The security device 402 includes various modules, such as executable software programs, including a classification engine 404 for classifying packets including classifying packets based on information in packet headers and packet content. A security policy manager 406 maintains security policies for a variety of external networks 490. For example, the security policy manager 406 provides an interface (e.g., a web page) for network administrators to provide preferences for security processing, and selects security policies for packets and according to their originating external networks 490. A security processing engine 408 performs security processing in accordance with security policies managed by the security policy manager 406 and the classification engine 404.

Each module runs as part of the operating system on the security device 402, runs as an application on the security device 402, or runs as part of the operating system and part of an application on the security device 402, for instance. Although several software modules are illustrated, there may be fewer or more software modules. Moreover, the software modules can be distributed on one or more data processing apparatus connected by one or more networks or other suitable communication mediums.

The security device 402 also includes hardware or firmware devices including one or more processors 412, one or more additional devices 414, a computer readable medium 416, a communication interface 418, and one or more user interface devices 420. Each processor 412 is capable of processing instructions for execution within the server 402. In some embodiments, the processor 412 is a single or multi-threaded processor. Each processor 412 is capable of processing instructions stored on the computer readable medium 416 or on a storage device such as one of the additional devices 414. The security device 402 uses its communication interface 418 to communicate with one or more computers 490, for example, over a network 480. Examples of user interface devices 420 include a display, a camera, a speaker, a microphone, a tactile feedback device, a keyboard, and a mouse. The security device 402 can store instructions that implement operations associated with the modules described above, for example, on the computer readable medium 416 or one or more additional devices 414, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, that is, one or more modules of computer program instructions, encoded on computer storage medium for execution by, or to control the operation of, data processing apparatus. Alternatively or in addition, the program instructions can be encoded on an artificially generated propagated signal, such as a machine-generated electrical, optical, or other form of non-transitory mechanism (e.g., tangible computer readable medium), that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, such as an FPGA (field programmable gate array) or an ASIC (application specific integrated circuit). The apparatus can also include, in addition to hardware, code that creates an execution environment for the computer program in question, such as code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (e.g., also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, such as an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, such as magnetic, magneto optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, such as EPROM, EEPROM, and flash memory devices; magnetic disks, such as internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, such as a data server, or that includes a middleware component, such as an application server, or that includes a front end component, such as a client computer having a graphical user interface or a Web browser through which a user can interact with an implementation of the subject matter described in this specification, or any combination of one or more such back end, middleware, or front end components. The components of the system can be interconnected by any form or medium of digital data communication, such as a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 5:
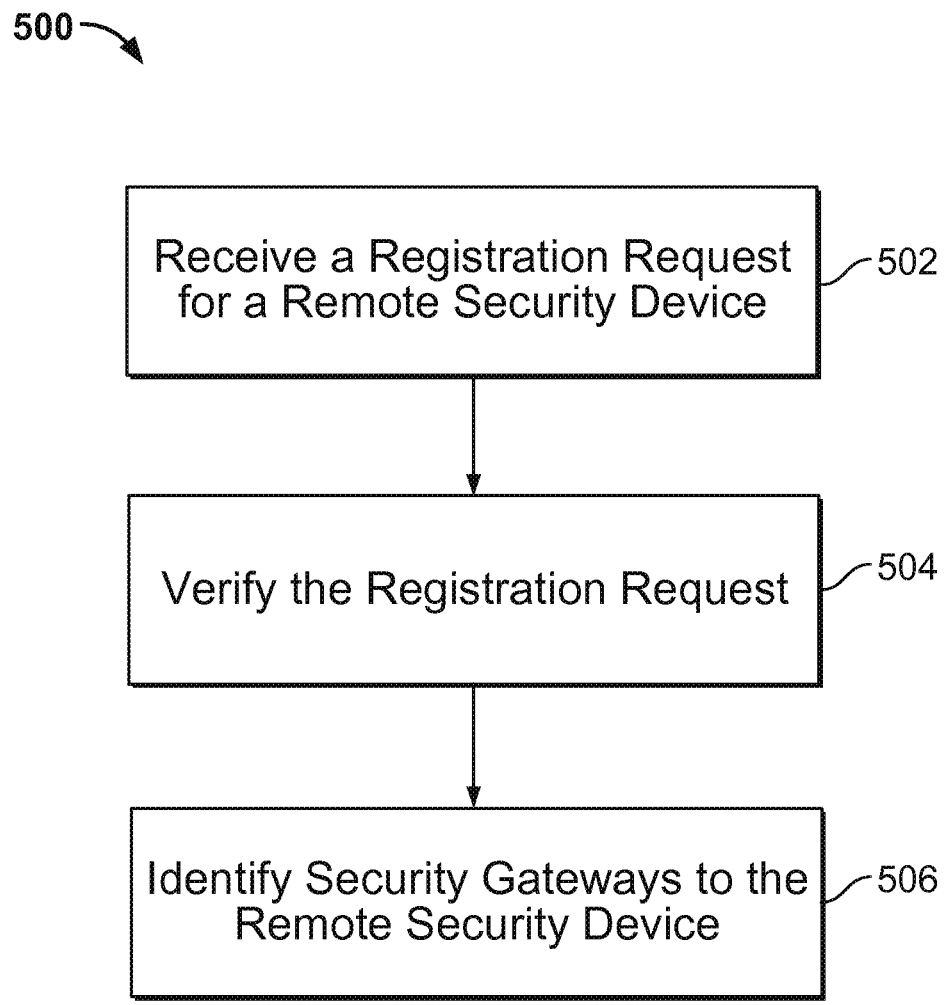
FIG. 5 is a flow diagram illustrating techniques for configuring and managing remote security devices in accordance with some embodiments.

FIG. 5 is a flow diagram illustrating techniques for configuring and managing remote security devices in accordance with some embodiments. For purposes of illustration, the process 500 will be described with respect to a system (e.g., portal 130 in communication with a remote security device 110 or 126) that performs the process. At 502, a device for configuring and managing a plurality of remote security devices (e.g., a console device or portal) receives a registration request for a remote security device. For example, the console device can be configured to recognize a unique identifier associated with the remote security device (e.g., serial number, MAC address, another unique identifier, and/or any combination thereof), and the remote security device can be preconfigured with a URL or IP address of the console device, so that the remote security device can automatically send the registration request to the console device after being connected to an external network and powered on (e.g., the console device and/or the remote security device can also be preconfigured with the network address information associated with the external network, that is, the external network address information that identifies the IP addresses of the external network that are protected or behind the remote security device; and if the remote security device has the external network address information, then the remote security device can provide that information to the console device as part of an initial setup protocol and process). As another example, a user (e.g., a network administrator or security administrator) can access a portal to initially setup the remote security device using a browser by entering a URL or IP address (e.g., the portal can require providing various credentials to verify authorization and user access rights). The user can be prompted to enter unique identifier information associated with the remote security device as part of the initial setup and configuration of the remote security device on the external network. The user can also be prompted to enter the network address information associated with the external network protected or behind the remote security device.

At 504, the device for configuring and managing a plurality of remote security devices verifies the registration request to determine that the remote security device is an authorized remote security device for an external network. At 506, the device for configuring and managing a plurality of remote security devices sends a response identifying one or more security gateways to the remote security device, in which the remote security device is automatically configured to connect to each of the security gateways using, for example, a distinct Layer 3 protocol tunnel. In some embodiments, the device for configuring and managing a plurality of remote security devices also sends a certificate (e.g., or other secure identifier) to the remote security device (e.g., which can be used for a secure tunnel between the remote security device and a security gateway, and if the certificate is not validated by the security gateway, then the request to establish a secure tunnel will be denied). In some embodiments, the security device also receives a security policy for managing the security associated with the external network protected by the remote security device. In some embodiments, the device for configuring and managing a plurality of remote security devices also sends network address information for the respective networks protected by each of the security gateways to the remote security device (e.g., so the remote security device can then appropriately route network access requests directed to destinations on the network protected by a given security gateway to that security gateway using the secure tunnel).

In some embodiments, a remote security device is preconfigured or preloaded with information identifying one or more security gateways and preconfigured or preloaded with a certificate (e.g., or other secure identifier). For example, when such a remote security device is connected to an external network and powered on, the remote security device can use the preconfigured or preloaded information identifying one or more security gateways to establish a secure tunnel with each of the identified one or more security gateways.

In some embodiments, the remote security device is configured to route at least a portion of outbound network traffic from the external network to a first security gateway over the remote security device's associated tunnel, in which the first security gateway performs security processing on the received outbound traffic based on a security policy. In some embodiments, if the first security gateway is no longer available for communication with the remote security device or is busy (e.g., based on bandwidth, availability, prioritization, and/or other criteria or work load balancing schemes), the remote security device can be configured to route certain traffic to a second security gateway (and/or other security gateways) over the remote security device's associated tunnel using a distinct Layer 3 protocol tunnel (e.g., VPN tunnel), in which the second security gateway is included in the identified one or more security gateways and can perform security processing for the routed traffic for the remote security device.

In some embodiments, the device for configuring and managing a plurality of remote security devices identifies (e.g., periodically or based upon an event, such as a configuration update or change or if one of the security gateways becomes over loaded or is down) an updated set of one or more security gateways to the authorized remote security device, in which the remote security device is automatically configured to connect to the updated set of one or more security gateways using secure tunnels, including a distinct Layer 3 protocol tunnel to a second security gateway, and in which the second security gateway is included in the identified updated set of one or more security gateways. For example, a remote security device at a satellite office can initially be configured to connect to a first security gateway at a main office. At a later point in time, the main office can add a second security gateway, and the remote security device at the satellite office can be automatically configured to connect to the second security gateway (e.g., an updated security gateway list can be pushed to the remote security device).

In some embodiments, the device for configuring and managing a plurality of remote security device revokes a certificate issued to the remote security device (e.g., based upon an event, such as a configuration change or a security related event, such as a requirement for a higher level of encryption), in which the remote security device can no longer connect to the first security gateway after revocation of its certificate.

Figure 6:
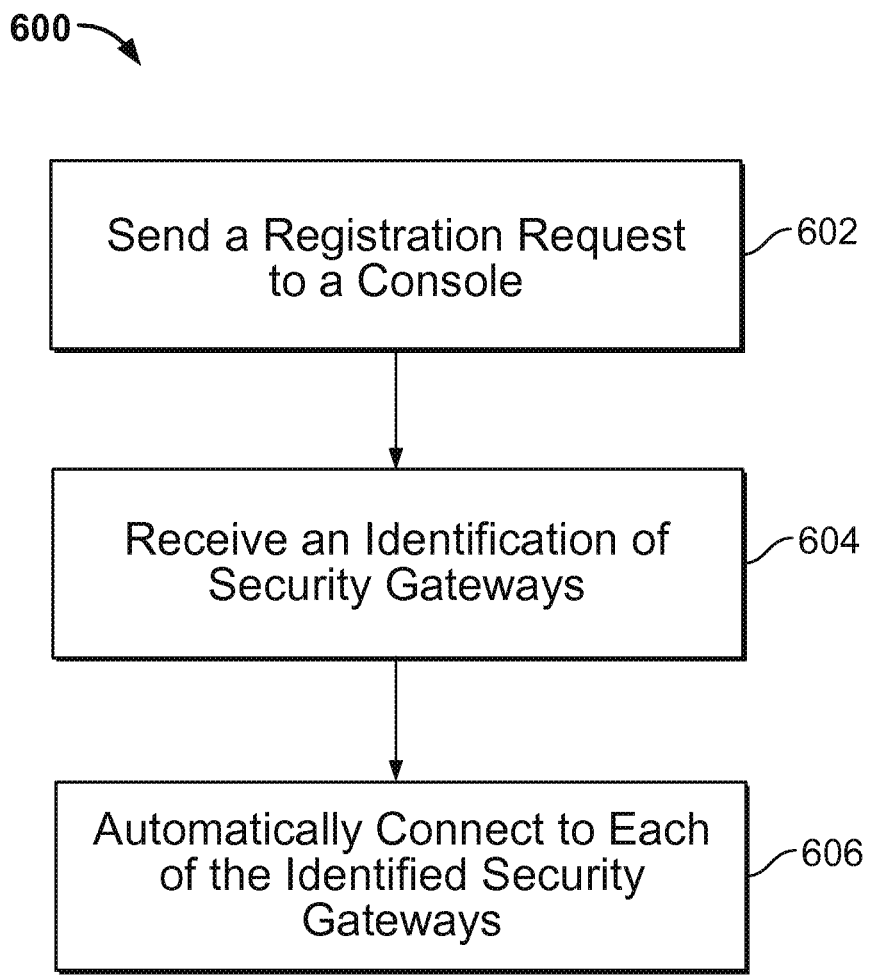
FIG. 6 is a flow diagram illustrating techniques for configuring and managing remote security devices in accordance with some embodiments.

FIG. 6 is a flow diagram illustrating techniques for configuring and managing remote security devices in accordance with some embodiments. For purposes of illustration, the process 600 will be described with respect to a system (e.g., remote security device 110 or 126 in communication with portal 130 and security gateway 102 in communication with) that performs the process. At 602, a remote security device sends a registration request to a console device for configuring and managing a plurality of remote security devices each associated with one or more external networks, in which the registration request includes credentials for verifying the remote security device. At 604, the remote security device receives a response identifying one or more security gateways. At 606, the remote security device automatically attempts to connect to each of the one or more security gateway over the remote security device's associated tunnel using a distinct Layer 3 protocol tunnel (e.g., a VPN tunnel).

In some embodiments, if the remote security device receives a response identifying two or more security gateways, the remote security device attempts to connect to each of the two or more security gateways. In this example, the security device can then communicate using each of the security gateways using the various techniques described herein.

For example, the selection of which security gateway to use for routing certain traffic can also be based on a prioritized order and/or based on other criteria or parameters (e.g., bandwidth, availability, content/resource location, configuration settings, etc.).

In some embodiments, a security gateway receives and processes routes published by each of the remote security devices. In some embodiments, the security gateway accepts or denies one or more routes published by each of the remote security devices. In some embodiments, the security gateway informs a given remote security device of routes that the security gateway denied (e.g., based on its configuration) and will not populate in its route table. In some embodiments, the security gateway detects duplicate routes published by various remote security devices and informs such remote security device(s) of the detected duplicate routes. In some embodiments, the security gateway and/or remote security device monitor the aliveness of each of the secure tunnels between them and, for example, can initiate responsive actions (e.g., reconnect, terminate, alert, log, report, and/or other action(s)) if a secure tunnel endpoint or a device behind the tunnel is found to be unreachable for a predetermined period of time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor of a device for configuring and managing a plurality of remote security devices configured to:
        receive a registration request for a remote security device, wherein the registration request includes a serial number of the remote security device, a media access control (MAC) address of the remote security device, or a user entered unique identifier, or any combination thereof;
        verify the registration request to determine that the remote security device is an authorized remote security device for an external network;
        send a response identifying one or more security gateways to the remote security device, wherein the sending of the response includes sending a certificate to the remote security device to establish an associated tunnel;
        identify an updated prioritized list of two or more security gateways to the remote security device, wherein the remote security device is automatically configured to connect to a second security gateway over the remote security device's associated tunnel, wherein the second security gateway is included in the updated prioritized list of two or more security gateways, wherein each of the two or more security gateways performs security processing on received outbound network traffic based on a security policy, and wherein the remote security device routes traffic based on an availability of security gateways identified in the updated prioritized list of two or more security gateways; and
        revoke the certificate issued to the remote security device, wherein the remote security device can no longer connect to a first security gateway after revocation of its certificate; and
    a memory of the device for configuring and managing a plurality of remote security devices coupled to the processor of the device for configuring and managing a plurality of remote security devices and configured to provide the processor of the device for configuring and managing a plurality of remote security devices with instructions.

2. The system recited in claim 1, wherein the remote security device is automatically configured to connect to each of the two or more security gateways over the remote security device's associated tunnel using a distinct Layer 3 protocol tunnel.

3. The system recited in claim 1, wherein the remote security device is configured to route selected outbound network traffic from the external network to the two or more security gateways over the remote security device's associated tunnel.

4. The system recited in claim 1, wherein the remote security device is configured to route selected outbound network traffic from the external network to the two or more security gateways over the remote security device's associated tunnel, and wherein each of the two or more security gateways forwards the selected outbound network traffic to an original destination after performing the security processing, the original destination being external to a network associated with the two or more security gateways.

5. The system recited in claim 1, wherein the first security gateway and the second security gateway are included in the identified two or more security gateways.

6. The system recited in claim 1, wherein the device for configuring and managing the plurality of remote security devices executes a portal that can be used for configuring and managing the plurality of remote security devices.

7. The system recited in claim 1, wherein each of the plurality of security devices is connected to a distinct external network that is associated with a distinct entity.

8. The system recited in claim 1, wherein the remote security device is automatically configured to connect to each of the two or more security gateways over the remote security device's associated tunnel using a distinct Layer 3 protocol tunnel, and wherein the distinct Layer 3 protocol tunnel is a virtual private network (VPN) tunnel.

9. The system recited in claim 1, wherein the processor of the device for configuring and managing the plurality of remote security devices is further configured to:
    receive the security policy for managing security associated with the external network protected by the remote security device.

10. The system recited in claim 1, wherein the remote security device routes traffic to one of the first security gateway and the second security gateway based on a level of traffic on the external network, a network capacity, and/or availability of the first and second security gateways, or any combination thereof.

11. The system recited in claim 1, wherein the remote security device is automatically configured to connect to each of the two or more security gateways over the remote security device's associated tunnel using a distinct Layer 3 protocol tunnel, and wherein a processor of the first security gateway is further configured to:
    receive a plurality of packets from a plurality of external networks, each packet being received from the distinct Layer 3 protocol tunnel that terminates at an edge of one of the external networks;
    select a respective security policy for each of the received packets according to the external network from which the packet was received;
    perform security processing on payloads of each of the received packets according to their respective selected security policies; and a memory of the first security gateway coupled to the processor of the first security gateway and configured to provide the processor of the first security gateway with instructions.

12. The system recited in claim 1, wherein a processor of the first security gateway is further configured to:
examine the payload to classify the payload including classifying the payload using information included in a payload header and payload content;
determine instructions for processing the payload based on the information and the packet's respective security policy;
process the payload using the instructions to perform signature matching on the payload content, wherein processing the packet comprises one or more of logging, storing, allowing the packet to pass, setting an alarm, blocking the packet, or dropping the packet, and wherein a payload of a packet in the plurality of packets is a Layer 3 protocol packet or a Layer 4 protocol packet; and
a memory of the first security gateway coupled to the processor of the first security gateway and configured to provide the processor of the first security gateway with instructions.

13. The system recited in claim 1, wherein the remote security device routes traffic based on an availability of a highest priority security gateway identified in the updated prioritized list of two or more security gateways.

14. A method, comprising:
receiving a registration request for a remote security device at a device for configuring and managing a plurality of remote security devices, wherein the registration request includes a serial number of the remote security device, a media access control (MAC) address of the remote security device, or a user entered unique identifier, or any combination thereof;
verifying the registration request to determine that the remote security device is an authorized remote security device for an external network;
sending a response identifying one or more security gateways to the remote security device, wherein the sending of the response includes sending a certificate to the remote security device to establish an associated tunnel;
identifying an updated prioritized list of two or more security gateways to the remote security device, wherein the remote security device is automatically configured to connect to a second security gateway over the remote security device's associated tunnel using a distinct Layer 3 protocol tunnel, wherein the second security gateway is included in the updated prioritized list of two or more security gateways, wherein each of the two or more security gateways performs security processing on received outbound network traffic based on a security policy, and wherein the remote security device routes traffic based on an availability of security gateways identified in the updated prioritized list of two or more security gateways; and
revoking the certificate issued to the remote security device, wherein the remote security device can no longer connect to a first security gateway after revocation of its certificate.

15. A computer program product, the computer program product being embodied in a non-transitory computer readable storage medium and comprising computer instructions for:
receiving a registration request for a remote security device at a device for configuring and managing a plurality of remote security devices, wherein the registration request includes a serial number of the remote security device, a media access control (MAC) address of the remote security device, or a user entered unique identifier, or any combination thereof;
verifying the registration request to determine that the remote security device is an authorized remote security device for an external network;
sending a response identifying one or more security gateways to the remote security device, wherein the sending of the response includes sending a certificate to the remote security device to establish an associated tunnel;
identifying an updated prioritized list of two or more security gateways to the remote security device, wherein the remote security device is automatically configured to connect to a second security gateway over the remote security device's associated tunnel using a distinct Layer 3 protocol tunnel, wherein the second security gateway is included in the updated prioritized list of two or more security gateways, wherein each of the two or more security gateways performs security processing on received outbound network traffic based on a security policy, and wherein the remote security device routes traffic based on an availability of security gateways identified in the updated prioritized list of two or more security gateways; and
revoking the certificate issued to the remote security device, wherein the remote security device can no longer connect to a first security gateway after revocation of its certificate.

16. A system, comprising:
a processor of a remote security device for an external network, wherein the processor of the remote security device is configured to:
send a registration request to a device for configuring and managing a plurality of remote security devices each associated with one or more external networks, wherein the registration request includes credentials for verifying the remote security device is an authorized remote security device for the external network, and wherein the credentials include a serial number of the remote security device, a media access control (MAC) address of the remote security device, or a user entered unique identifier, or any combination thereof;
receive a response identifying one or more security gateways, wherein the response includes a certificate;
receive an updated prioritized list identifying two or more security gateways, wherein a first security gateway, and a second security gateway are included in the updated prioritized list identifying two or more security gateways;
automatically connect to each of the two or more security gateways identified in the updated prioritized list over the remote security device's associated tunnel using a distinct Layer 3 protocol tunnel, wherein the connecting to the each of the two or more security gateways includes establishing the associated tunnel based on the certificate; and
route selected outbound network traffic to the two or more security gateways over the remote security device's associated tunnel using the distinct Layer 3 protocol tunnel, wherein each of the two or more security gateways performs security processing on received outbound network traffic based on a security policy, and wherein the remote security device routes traffic based on an availability of the two or more security gateways identified in the updated prioritized list; and receive a revocation of the certificate issued to the remote security device, wherein the remote security device can no longer connect to the first security gateway after revocation of its certificate; and a memory of the remote security device coupled to the processor of the remote security device and configured to provide the processor of the remote security device with instructions.

17. The system recited in claim 16, wherein the two or more security gateways forwards the selected outbound network traffic to an original destination after performing the security processing, the original destination being external to a network associated with the two or more security gateways.

18. The system recited in claim 16, wherein routing at least a portion of outbound network traffic from the external network to the first security gateway over the remote security device's associated tunnel is implemented by the remote security device.

19. The system recited in claim 16, wherein the distinct Layer 3 protocol tunnel is a virtual private network (VPN) tunnel.

20. The system recited in claim 16, wherein a processor of the remote security device is further configured to:

receive a security policy for managing security associated with the external network protected by the remote security device.

21. The system recited in claim 16, wherein a processor of the first security gateway is further configured to:

receive a plurality of packets from a plurality of external networks, each packet being received from the distinct Layer 3 protocol tunnel that terminates at an edge of one of the external networks;

select a respective security policy for each of the received packets according to the external network from which the packet was received;

perform security processing on payloads of each of the received packets according to their respective selected security policies; and a memory of the first security gateway coupled to the processor of the first security gateway and configured to provide the processor of the first security gateway with instructions.

22. The system recited in claim 16, wherein a processor of the first security gateway is further configured to:

examine the payload to classify the payload including classifying the payload using information included in a payload header and payload content;

determine instructions for processing the payload based on the information and the packet's respective security policy;

process the payload using the instructions to perform signature matching on the payload content, wherein processing the packet comprises one or more of logging, storing, allowing the packet to pass, setting an alarm, blocking the packet, or dropping the packet, and wherein a payload of a packet in the plurality of packets is a Layer 3 protocol packet or a Layer 4 protocol packet; and a memory of the first security gateway coupled to the processor of the first security gateway and configured to provide the processor of the first security gateway with instructions.

23. The system recited in claim 16, wherein the remote security device routes traffic based on an availability of a highest priority security gateway identified in the updated prioritized list of two or more security gateways.

* * * * *